UNITED STATES PATENT OFFICE.

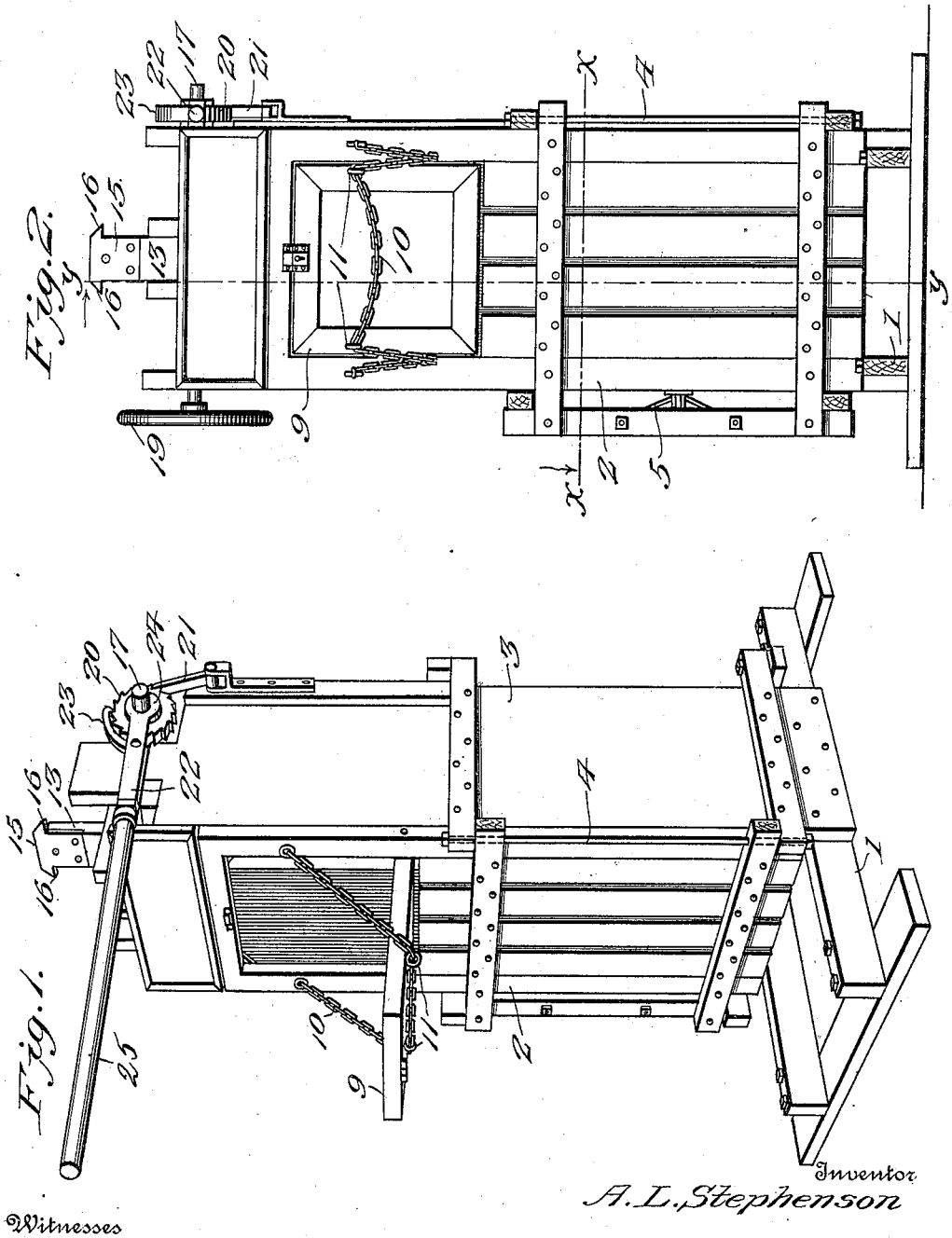

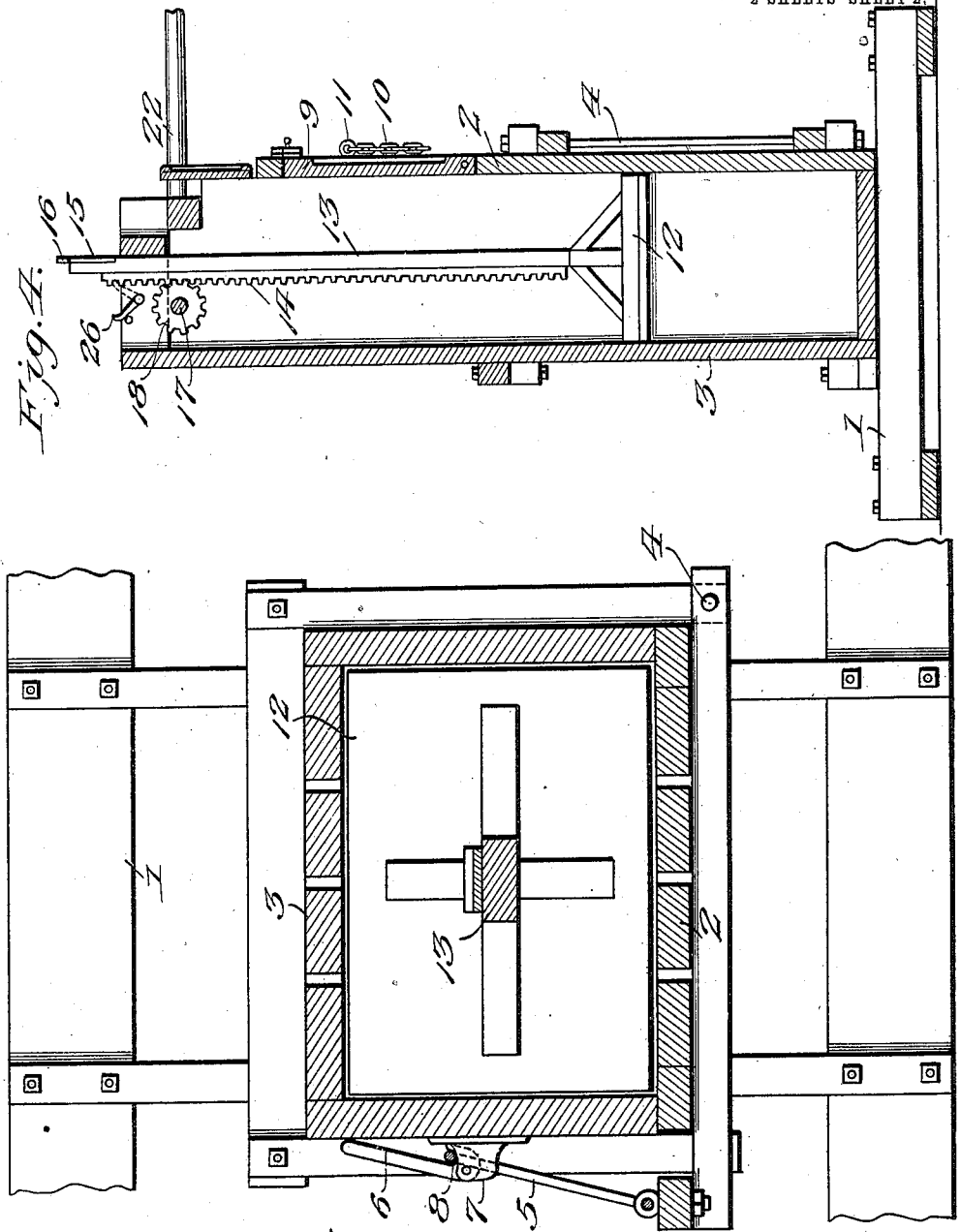

ANDERSON L. STEPHENSON, OF FINDLAY, OHIO; WILLIAM E. STEPHENSON, OF FINDLAY, OHIO, ADMINISTRATOR OF SAID ANDERSON L. STEPHENSON, DECEASED.

BALING-PRESS.

981,491.   Specification of Letters Patent.   Patented Jan. 10, 1911.

Application filed April 16, 1910. Serial No. 555,774.

*To all whom it may concern:*

Be it known that I, ANDERSON L. STEPHENSON, a citizen of the United States, residing at Findlay, in the county of Hancock and State of Ohio, have invented new and useful Improvements in Baling-Presses, of which the following is a specification.

The present invention provides a press designed most especially for compressing paper, excelsior and other loose waste material into compact form for handling and storing, the purpose being to provide a machine of the character stated which may be supplied at a comparatively small cost so that merchants may compress into a small compass waste material and thereby prevent accumulation of loose packing material and the danger incident to the same catching afire either by spontaneous combustion or from other cause.

The invention further provides a press which will enable loose material to be formed into bales of predetermined size, the press being of such construction as to be easily manipulated by one person and designed to permit the bale when formed and bound to be easily removed from the baling chamber.

The invention consists of the novel features, details of construction and combination of parts, which hereinafter will be more particularly set forth, illustrated in the accompanying drawings, and pointed out in the appended claim.

Referring to the drawings, forming a part of the application, Figure 1 is a perspective view of a baling press embodying the invention. Fig. 2 is a front view thereof. Fig. 3 is a horizontal section on the line $x$—$x$ of Fig. 2. Fig. 4 is a vertical section on the line $y$—$y$ of Fig. 2.

Corresponding and like parts are referred to in the following description, and indicated in all the views of the drawings, by the same reference characters.

The press is constructed so as to occupy a vertical position, although this is not essential but is preferred so as to occupy a small space. A base is provided for supporting the baling chamber or body of the press. The base is indicated at 1 and comprises longitudinal and transverse beams, which are connected in a manner to provide a substantial structure. The baling chamber or body of the press is mounted upon the base 1 and embodies four inclosing walls, one of the walls designated as the front 2 being hinged so as to swing open, thereby admitting of ready access being had to the interior of the baling chamber for removal of the bale or for other purpose. The body 3 of the press has its walls strengthened by horizontal bars which are secured thereto in any manner. The front 2 is hinged by means of a rod 4, which passes through end portions of the horizontal bars, said end portions projecting and crossing at one corner of the body. The front when closed is made secure by means of a bale 5, which is of triangular form and pivoted at one of its sides to the free end of the front. A latch 6 pivoted to a bracket 7 attached to a side of the body has a hook 8 which is adapted to engage the free end of the bale 5 so as to draw upon the same and hold the front 2 securely closed. The hook 8 occupies a position between the side of the press and a plane passing through the pivot connection of the latch 6 with the bracket 7, hence the front 2 is prevented from opening when the material within the baling chamber is subjected to compressive force. The upper portion of the front 2 is provided with an opening, which is closed by means of a door 9, the latter being hinged at its lower end to the front so as to swing downward at its upper end. A chain 10 or like flexible connection is secured at its ends to the front 2 upon opposite sides of the opening closed by the door 9 and passes through eyes 11 secured to edge portions of the door 9 near the upper end thereof, said chain serving to limit the movement of the door when swung downward, as indicated most clearly in Fig. 1. The door 9 when swung downward serves as a support to receive any loose material that may drop when feeding the press, said material being fed to the baling chamber through the opening provided when the door 9 is swung downward. The door 9 when closed is made secure by a suitable fastening.

The plunger or follower 12 is of a size to fit loosely within the baling chamber and is provided with a centrally disposed bar 13, which is strengthened at its juncture with the follower by means of braces or stays. The plunger bar 13 is mounted in suitable guides at the top of the press body and has a rack bar 14 secured to one side. The plunger 12 and plunger bar 13 are usually of wood and the rack bar 14 is of metal and securely attached to the plunger bar. A cap piece 15 is attached to the upper end of the plunger bar by means of bolts and has lateral extensions 16, which limit the downward movement of the plunger by engaging the guide at the upper end of the press body when said plunger is moved downward to its lowest position. A horizontal shaft 17 is mounted in bearings provided at opposite sides of the press body near the upper end thereof. A pinion 18 secured to the shaft 17 is in mesh with the rack bar 14 and serves to move the plunger upward or downward according to the direction of rotation of the shaft. The shaft 17 may be operated by any suitable means, it being preferred to apply a hand wheel 19 to one end thereof. A ratchet wheel 20 is secured to the opposite end of the shaft 17 and a dog 21 pivoted to the press body coöperates with the teeth of the ratchet wheel to hold the follower depressed and prevent upward movement thereof by any rebounding action. The ratchet wheel 20 also provides means whereby force may be conveniently and advantageously applied to the shaft 17 to turn the same and move the plunger 12 downward to further compress the material when it is practically impossible to turn the shaft 17 by means of the hand wheel 19. A lever 22 is mounted upon the shaft 17 to swing loosely thereon and is provided with a hooked dog 23, which is adapted to engage the teeth of the ratchet wheel 20 so as to turn the same when oscillating the lever 22. Links 24 are secured at one end to opposite sides of the lever 22 and embrace the ratchet wheel 20 and are provided at their opposite ends with eyes through which the shaft 17 passes. An extension 25 may be fitted to the lever 22 so as to increase the leverage and thereby facilitate the turning of the shaft 17 when it is necessary to apply great force for compressing the bale during the final condensing thereof. After the bale has been formed and compressed to the required extent it is bound in the well known manner, after which the plunger 12 is moved upward and the front released and swung open so that the completed bale may be removed from the baling chamber. The plunger is run upward by operation of the shaft 17 through the instrumentality of the hand wheel 19. It is obvious that during the first stages of compressing the material after the same has been fed into the baling chamber through the opening closed by means of the door 9 the plunger may be moved downward quickly by operating the shaft 17 through means of the hand wheel 19, but when the bale is compressed to an extent such as to prevent further convenient operation of the plunger by means of the hand wheel 19 the shaft 17 may be further operated by means of the lever 22 and subsequently by attachment of the extension 25 to said lever 22. After the plunger 12 has been moved upward it is held elevated by means of a dog 26, which is pivoted at one end to the press body and is adapted to engage the teeth of the rack bar 14. When moving the plunger downward in the compressing of the bale the dog 26 is swung back out of the way.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

Having thus described the invention what is claimed as new, is:—

A press of the character specified comprising a base, a body mounted upon the base and inclosing a baling chamber, said body having a wall or side hinged and formed in its upper portion with an opening, a door for closing said opening and hinged at its lower end so as to swing outward and downward, a flexible connection for limiting the outward movement of the door and attached at its ends to the swinging side of the body upon opposite sides of the opening and having engagement between its ends with said door, a plunger arranged to operate within the baling chamber and having a bar provided along one side with teeth, a shaft mounted upon the press body and having a pinion in mesh with the teeth of the plunger bar, means for moving the shaft rapidly, other means applied to the shaft to admit of turning the same with great force and embodying a ratchet wheel and a lever, the latter having a dog to coöperate with the ratchet wheel, and a dog mounted upon the body and adapted to engage the teeth of the plunger bar to hold the plunger when elevated.

In testimony whereof I affix my signature in presence of two witnesses.

ANDERSON L. STEPHENSON.

Witnesses:
  LLEWELLA BIGGS,
  R. K. DAVIS.